United States Patent [19]

Hoots et al.

[11] Patent Number: 4,869,828
[45] Date of Patent: Sep. 26, 1989

[54] STABILIZATION OF IRON IN AQUEOUS SYSTEMS

[75] Inventors: John E. Hoots, St. Charles; Kenneth P. Fivizzani, Naperville, both of Ill.; Roy I. Kaplan, Sugar Land, Tex.

[73] Assignee: Nalco Chemical Company, Naperville, Ill.

[21] Appl. No.: 160,672

[22] Filed: Feb. 26, 1988

[51] Int. Cl.$^4$ ................................................ C02F 5/12
[52] U.S. Cl. ..................................... 210/701; 252/180
[58] Field of Search .............................. 210/698-701; 252/180, 181

[56] References Cited

U.S. PATENT DOCUMENTS

| | | | |
|---|---|---|---|
| 3,170,883 | 2/1965 | Owen et al. | 252/187 |
| 3,709,815 | 1/1973 | Boothe et al. | 210/58 |
| 3,709,816 | 1/1973 | Walker et al. | 210/58 |
| 3,806,367 | 4/1974 | Lange et al. | 210/701 |
| 3,928,196 | 12/1975 | Persinski et al. | 210/58 |
| 4,434,059 | 2/1984 | Johnson et al. | 252/180 |
| 4,451,376 | 5/1984 | Sharp | 210/701 |
| 4,532,048 | 7/1985 | Amjad et al. | 210/701 |
| 4,536,292 | 3/1984 | Matz | 210/701 |
| 4,584,105 | 4/1986 | Fong | 210/701 |
| 4,604,431 | 8/1986 | Fong et al. | 525/351 |
| 4,640,793 | 2/1987 | Persinski et al. | 210/697 |
| 4,642,194 | 2/1987 | Johnson | 210/699 |
| 4,703,092 | 10/1987 | Fong | 525/351 |
| 4,707,271 | 11/1987 | Amjad et al. | 210/701 |
| 4,711,725 | 12/1987 | Amick et al. | 210/701 |
| 4,752,443 | 6/1988 | Hoots et al. | 210/697 |

FOREIGN PATENT DOCUMENTS

| | | |
|---|---|---|
| 220726 | 6/1987 | European Pat. Off. . |
| 187491 | 5/1985 | Japan . |
| 187489 | 8/1985 | Japan . |

*Primary Examiner*—Peter Hruskoci
*Attorney, Agent, or Firm*—Joan I. Norek; John G. Premo; Donald G. Epple

[57] ABSTRACT

The present invention is directed to a process for stabilizing iron hydr(oxide) in aqueous systems which comprises adding to an aqueous system in which the water contains or will contain soluble iron a polymer which contains pendant N-substituted amide functionality, including amide substituted with sulfoalkyl wherein the alkyl is of 1 to 3 carbon atoms, sulfophenyl, or such groups substituted further with (poly)hydroxy.

14 Claims, No Drawings

STABILIZATION OF IRON IN AQUEOUS SYSTEMS

TECHNICAL FIELD OF THE INVENTION

The present invention is in the technical field of water treatment, and in particular the field of reducing or eliminating certain iron deposits in aqueous systems, particularly industrial aqueous systems.

BACKGROUND OF THE INVENTION

In aqueous systems, particularly industrial aqueous systems such as cooling water systems, boiler systems, and the like, it is undesirable to have contaminant deposits accumulating on the internal surfaces of the equipment and pipes and the like. Such deposits may interfere with water flow, accelerate corrosion of metal parts and surfaces, reduce heat transfer, and lead to other problems. Among the undesirable deposits that may form and accumulate in aqueous systems are deposits of insoluble iron compounds that are derived from soluble iron present in the water of the system.

Soluble iron may be introduced into an aqueous system by its presence in the feed or source water or in other ways. Soluble iron is generally believed to be iron in the form of its ferrous ion, which is in its second oxidation state, as $Fe^{+2}$, generally referred to as "iron (II)". Soluble iron, as this term is used herein, does not exclude, however, other forms of iron that may be dissolved or soluble in a given water system.

In aqueous water systems, and in particular industrial aqueous water systems, the presence of soluble iron in the feed or source water, or the introduction of soluble iron species into the water of the system by other means, can lead to the undesirable precipitation of iron oxides and iron hydroxides which may settle and accumulate as deposits on surfaces in contact with the water. Such precipitation occurs when the waters containing such soluble iron are changed to a more oxidative environment. In other words, such soluble iron may precipitate from solution upon encountering oxidizing conditions. A very typical oxidizing condition encountered in industrial aqueous systems is a water pH of greater than 7.0. For instance, a typical source water has a pH of less than 7.0. When such source water is brought into an aqueous system, it may undergo an increase in pH, for instance by being admixed with water having a higher pH or being subjected to water treatment(s) that raise the pH. At least some oxygen is generally present in such water. The precipitation of iron oxides and hydroxides from waters initially holding soluble iron upon an increase in pH to greater than 7.0, and more typically upon an increase in pH to 8.0 or higher, some oxygen being present, is a common phenomenon. Such oxidizing conditions which can lead to such precipitation are not limited to increases in pH, but also include for instance the introduction of, or increase in the level of, an oxidizing agent such as chlorine and the like. Thus two factors are involved, i.e., the presence of soluble iron in waters introduced into an aqueous system, and then the in situ precipitation of iron oxide and hydroxide when the oxidizing condition of the aqueous environment is increased.

As to iron precipitates, it is believed that most of such precipitate is composed of ferric oxide and ferric hydroxide, wherein the iron is in its oxidation state of three, referred to as "iron (III)". In the field of the present invention and for the purposes of the present invention the relative proportions of the precipitate between ferric oxide and ferric hydroxide is not important nor does it matter whether some, or even all, of the iron precipitate is ferrous oxide or ferrous hydroxide. Hence the iron precipitate, which is generally a mixture of ferric oxide and ferric hydroxide, possibly with some ferrous species therein, will be referred to hereinafter as iron (hydr)oxide. It is also to be understood that the term iron hydr(oxide) includes any and all hydrated forms of such oxides and hydroxides.

In a typical aqueous system, the reduction or elimination of iron hydr(oxide) deposits is not the only problem addressed in treating the water to avoid the accumulation of contaminant deposits. For instance inhibition of scale deposits such as calcium phosphate scale, calcium organophosphate scale, and the like, is often important. The presence of iron has at times been found to interfere with chemical treatments employed to inhibit such types of scale. Hence a water treatment that reduces or eliminates iron hydr(oxide) deposits that also inhibits other scale deposits despite the presence of iron has additional advantages in water treatment as to efficacy and economy.

It is an object of the present invention to provide a process that reduces or eliminates iron hydr(oxide) deposits that are, or can be, formed when the oxidizing conditions of an aqueous system that contains soluble iron are increased. It is an object to provide such a process wherein the presence of iron does not interfere with at least some scale inhibition treatments, for instance treatments to inhibit calcium phosphate scale, calcium organophosphate scale, and like, including situations wherein the present process has the additional effect of inhibiting such scale. These and other objects of the invention are described in more detail below.

DISCLOSURE OF THE INVENTION

The present invention provides a process for the stabilization of iron hydr(oxide) deposits or precipitates in aqueous systems wherein soluble iron is introduced into such system and thereafter a water environment having an increased oxidizing condition is encountered, which process is comprised of the addition to such aqueous system an amount of a certain agent, described below, effective to stabilize such iron hydr(oxide). It is believed that the process of the present invention reduces or eliminates iron hydr(oxide) deposits in such aqueous systems by the mechanisms of inhibition of incipient precipitate, and/or solubilization, and/or dispersancy of precipitate. The present invention is not dependent upon which mechanism, or whether a combination of mechanisms, is involved in providing the advantageous effects of the process. The process of the present invention provides a level of a certain agent in such aqueous systems without which significantly higher amounts of iron hydr(oxide) deposits would form upon soluble iron being present when increased oxidizing conditions are encountered. As discussed in more detail below, the advantages of the present process may be demonstrated by the level of iron in water samples after deposits have settled, as compared to like-processed water samples that do not contain the agent employed in the present process. For purposes generally of water treatment, and for the purposes of the present invention, it does not matter whether the iron retained in the water is in a solubilized form or is effectively dispersed so as to prevent settling. The present invention provides a process wherein a level of aforesaid certain agent is maintained in aqueous water systems.

The above-mentioned agent employed in the present invention is a polymer containing pendant N-substituted amide functionality having the chemical formula of Formula I:

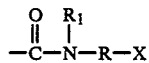

Formula I wherein $R_1$ is hydrogen or alkyl, R is alkylene having 1 to 3 carbon atoms or phenylene, X is sulfonate, and the alkylene and phenylene may be further substituted with (poly)hydroxy.

In preferred embodiment the pendant N-substituted amide functionality is within polymer units having the chemical formula of Formula II:

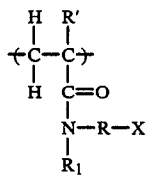

Formula II wherein R' is hydrogen or methyl and R, $R_1$, and X are as defined above for Formula I.

In preferred embodiment such N-substituted amide-containing polymer is a polymer substantially derived from ethylenically unsaturated amide-containing and carboxylate-containing monomers, subjected to post-polymerization derivatization wherein some or all of the amide functionality is converted to N-substituted amide functionality according to Formulas I or II above.

These and other preferred embodiments of the present invention are described in more detail below.

PREFERRED EMBODIMENTS OF THE INVENTION

The polymer employed in the present invention in preferred embodiment may be one containing units of sulfomethyl acrylamide, sulfomethyl methacrylamide, sulfoethyl acrylamide, sulfoethyl methacrylamide, sulfopropyl acrylamide, sulfopropyl methacrylamide, hydroxysulfoethyl acrylamide, hydroxysulfoethyl methacrylamide, hydroxysulfopropyl acrylamide, particularly 2-hydroxy-3-sulfopropyl acrylamide, hydroxysulfopropyl methacrylamide, sulfophenyl acrylamide, sulfophenyl methacrylamide, hydroxysulfophenyl acrylamide, and hydroxysulfophenyl methacrylamide, it being understood that where the unit as designated includes isomers, such as the designation hydroxysulfophenyl acrylamide, all reasonable isomers thereof are included.

The polymer employed in the present invention in preferred embodiment contains units derived from acrylic acid and methacrylic acid as the carboxylate containing monomers, although such carboxylate functionality may be derived from other carboxylate containing monomers such maleic anhydride or acid, itaconic acid, and the like, It has been demonstrated that process of the present invention is extremely effective using polymers wherein the carboxylate functionality is derived from acrylic acid, but the use of other carboxylate-containing ethylenically unsaturated monomers is believed to provide a similarly active polymer. The term carboxylate as used herein includes the acid form and its alkali metal and ammonium salts.

The polymer employed in the present invention may be substantially a copolymer of N-substituted amide units and carboxylate-containing units, or in other embodiment it may be substantially a terpolymer that further contains unsubstituted amide units. In such latter instance, the unsubstituted amide units are preferably derived from the monomers acrylamide and methacrylamide.

The polymer employed in the present invention may contain mixtures of the above described N-substituted amide units or carboxylate-containing units, or unsubstituted amide units, or the polymer employed may be a mixture of polymers varying as to their N-substituted amide units or carboxylate-containing units, or unsubstituted amide units, and varying as to their molecular weights.

In preferred embodiment, the polymer employed in the present invention has a mole ratio of 5 to 85 moles of the N-substituted amide functionality-containing units to 15 to 95 moles of other unit(s). In further preferred embodiment such polymer has a molecular weight of from about 5,000 to 100,000. In further preferred embodiment, the polymer employed in the present invention is substantially a copolymer having a mole ratio of 5 to 75 moles of the N-substituted amide functionality-containing units to 25 to 95 moles of carboxylate-containing units. In another preferred embodiment, the polymer employed in the present invention is substantially a terpolymer having a mole ratio of from about 5 to about 85 moles of the N-substituted amide functionality-containing units, to from about 10 to about 90 moles of carboxylate-containing units, and from about 5 to about 85 moles of unsubstituted amide-containing units. In further preferred embodiment, such terpolymers have a molecular weight of from about 5,000 to 100,000. In more preferred embodiment, the polymer is substantially a copolymer having a mole ratio of units of from about 5 to about 50 moles of the N-substituted amide-containing units, to from about 50 to about 95 moles of the carboxylate-containing units. In other more preferred embodiment, the polymer is substantially a terpolymer having a mole ratio of units of from about 5 to about 70 moles of the N-substituted amide-containing units, to from about 20 to about 85 moles of the carboxylate-containing units, to from about 5 to about 60 moles of the unsubstituted amide-containing units. In more preferred embodiment, the copolymer or terpolymer has a molecular weight of from about 5,000 to about 85,000. In other preferred embodiment, the polymer is a copolymer or terpolymer having a mole ratio of units of from about 5 to about 50 moles of the N-substituted amide-containing units, to from about 40 to, about 85 moles of the carboxylate-containing units, to from 0 to about 50 moles of the unsubstituted amide-containing units. In other preferred embodiment, the polymer is substantially a terpolymer having a mole ratio of units of from about 5 to about 50 moles of the N-substituted amide-containing units, to from about 40 to about 85 moles of the carboxylate-containing units, to from about 10 to about 50 moles of the unsubstituted amide-containing units; in other preferred embodiment, the polymer is such a terpolymer having a molecular weight from about 5,000 to about 50,000.

In further preferred embodiment, the polymer employed in the present invention is an acrylic acid/sulfomethyl (meth)acrylamide copolymer; acrylic acid/sulfoethyl (meth)acrylamide copolymer; acrylic acid/(meth)acrylamide/sulfomethyl(meth)acrylamide terpolymer; acrylic acid/(meth)acrylamide/sulfoethyl (meth)acrylamide terpolymer; acrylic acid/sulfopropyl (meth)acrylamide copolymer; acrylic acid/(meth)acrylamide/sulfopropyl (meth)acrylamide terpolymer; acrylic acid/(meth)acrylamide/2-hydroxy-3-sulfopropyl (meth)acrylamide terpolymer; or acrylic acid/(meth)acrylamide/sulfophenyl (meth)acrylamide terpolymer.

In preferred embodiment, the polymer employed in the present invention are terpolymers of acrylic acid and (meth)acrylamide with either sulfomethyl (meth)acrylamide or sulfoethyl (meth)acrylamide, having mole ratios of from 40 to 85 moles of acrylic acid, to from 10 to 50 moles of (meth)acrylamide, to from 5 to 40 moles of sulfomethyl (meth)acrylamide or sulfoethyl (meth)acrylamide, and preferably such terpolymers have a molecular weight of from about 10,000 to about 40,000.

The polymeric compositions used in the present may be prepared by the molecular modification of a preexisting polymer chain of suitable length so as to incorporate a sulfonate substituent, as distinguished from attempts to build up a sufficiently large polymer from sulfonated monomers. One post-modification procedure is the reaction of an amide-containing polymer, such as an acrylamide- or methacrylamide-containing polymer, and a selected aminosulfonic acid; this reaction is believed to proceed by a transamidation mechanism. Such aminosulfonic acids include aminomethanesulfonic acid, 1-amino-2-hydroxy-3-propanesulfonic acid, 2-aminoethanesulfonic acid, 2-aminoethanesulfonic acid (taurine), 4-aminobenzenesulfonic acid (p-sulfanilic acid), and 3-aminobenzenesulfonic acid (metanilic acid). In addition, the alkali metal salts of these acids may be used in the preparation of the polymers used in the present invention. The selected aminosulfonic acid is advantageously added to a water solution of sodium hydroxide and the amide-containing polymer reactant, and the resultant mixture is then heated in a pressure reactor to a suitable temperature, such as 150° C., for a suitable length of time, such as 4 to 5 hours, after which the mixture is cooled and then either concentrated or dewatered to recover the adduct. Sulfomethylamide polymers can also be prepared by reacting a polyamide, such as an acrylamide-containing polymer, with formaldehyde-bisulfite or with aminomethane sulfonic acid at a suitable temperature, such as 150° C., for a suitable length of time, such as 4–5 hours.

EXAMPLE 1

Polymer Preparation

A mixture of poly(acrylamide [50 mole %] -acrylic acid) (150 g 31.5% solution in water, Mw 55,700); taurine (16.7 g); and sodium hydroxide (10.6 g 50% solution in water) was heated in a mini Parr pressure reactor at 150° C. for four hours. The reaction mixture was then cooled to room temperature. The molecular weight of the resulting polymer, determined by GPC using polystyrene sulfonate standard, was 56,000. The composition of the polymer was determined both by C-13 NMR and colloid titration and was found to contain about 50% carboxylate, 31% primary amide, and 19% sulfoethylamide.

EXAMPLE 2

Polymer Preparation

A mixture of poly(acrylamide [75 mole %] -acrylic acid) (150 g of 27.5% solution in water); sulfanilic acid (20.4 g); sodium hydroxide (9.3 g of 50% solution); and 10.5 g of water was heated in a mini Parr pressure reactor at 150° C. for five hours. The reaction mixture was thereafter cooled to room temperature. The molecular weight of the resulting polymer was 11,500 as determined by GPC using polystyrene sulfonate standard. The polymer contained about 5% sulfophenylamide, 47.5% primary amide, and 47.5% carboxylate as estimated by C-13 NMR.

EXAMPLE 3

Polymer Preparation

A mixture of poly(acrylamide [75 mole %] -acrylic acid) (150 g. of 27.5% solution in water); aminomethane sulfonic acid (13.2 g); and sodium hydroxide (10.2 g of 50% solution) was heated in a mini Parr pressure reactor at 125° C. for four-and-a-half hours. The reaction mixture was thereafter cooled to room temperature. The molecular weight of the resulting polymer was 15,900 as determined by GPC using polystyrene sulfonate standard. The polymer contained about 45% acrylic acid, 40% acrylamide, and 15% sulfomethylacrylamide as estimated by C-13 NMR.

The aqueous system in which the present process may be employed may be any aqueous system, regardless of whether the water therein is generally flowing or static, but in preferred embodiment the aqueous system is a commercial aqueous system, such as cooling water systems, water distribution systems, boiler water systems, and the like, wherein it is desirable to avoid the accumulation of deposits on surfaces in contact with the water, and wherein soluble iron within the water of the system is, or may be, subject to oxidizing condition(s) that otherwise could lead to the precipitation and accumulation of iron hydr(oxide).

As explained above, the process of the present invention includes water systems wherein soluble iron is introduced into the waters by any means and wherein the oxidizing condition(s) that could lead to the deposit of iron hydr(oxide) is of any type. A preferred embodiment of the process is a process wherein the oxidizing condition is an increase in the pH of the water that carries the soluble iron, in the presence of oxygen, to a pH of greater than 7.0, and in more preferred embodiment to a pH of 8.0 or higher. The water that carries the soluble iron hydr(oxide) may be subjected to such an increase in pH when it mixes with a stream of water of such or higher pH, or more directly by the introduction into the water of some pH-increasing agent.

The polymer used in the present process has been found to be extremely effective in the stabilization of iron hydr(oxide) when added to, or maintained in, waters wherein soluble iron is introduced and subject to oxidizing condition(s). In addition, the polymer generally inhibits such scale as calcium phosphate and calcium organophosphate scale in the presence of iron and hence the process is a practical one for the stabilization of iron hydr(oxide) in systems where other scale is a problem.

The degree of stabilization provided by the present process depends upon the level of soluble iron that is present in the water being treated, the level of the polymer of the present process being added or maintained, the level of oxidizing condition, for instance the pH to which the water is raised, the temperature of the water, the duration of time during which the water is at an elevated temperature, and other variables. Hence the process of the present invention, for a number of reasons such as water conditions and economic practicalities, may be used to merely reduce the accumulation of iron hydr(oxide) deposits within the aqueous system rather than to eliminate such deposits.

Hence given the numerous variables effecting the degree of stabilization provided by the present process and given the various degrees of performance that may deemed reasonable in a given circumstance, the amount of polymer to be deemed effective in terms of its concentration level in the water of an aqueous system is not reasonably definable. In typical industrial aqueous systems using typical source waters and not subjected to unusual means for introducing soluble iron an effective amount of the polymer of the present invention is generally from about 0.1 to 50 ppm concentration of such polymer in the water, and preferably from about 1.0 to about 25 ppm. In many aqueous systems, a level of polymer of the present invention in the amount of from 0.5 to 1 ppm of polymer for every 1 ppm of soluble iron may be deemed an effective amount, particularly when the oxiding condition is substantially an increase in pH to a pH of greater than 7.0, and more preferably to a pH of 8.0 or higher. The efficacy of the process of the present invention is further described and demonstrated in the following working Example 4.

EXAMPLE 4

A test and comparative tests were performed to similate the effectiveness of the present process in stabilizing iron hydr(oxide) as formed in situ under conditions often found in industrial aqueous systems, such a cooling towers. An aqueous test solution was prepared containing 10 ppm soluble iron ($Fe^{+2}$) plus a commonly encountered amount of calcium and magnesium ions. This test solution as prepared has a pH of less than 7.0. To equal aliquots of this test solution was added various dosages certain polymers, including a polymer of the present invention and other polymers of the type used commercially for scale inhibition and at times iron deposit inhibition. The aliquots were then each treated to raise the pH above 7.5, heated with stirring for a certain time period, and then allowed to stand at room temperature for a certain time period. Unfiltered samples were then taken from the top portion of each aliquot and these samples were analyzed for iron content by atomic absorption analysis. The higher the iron content in the top part of the aliquot the higher was the stabilization activity of the polymer tested; for instance a level of 10 ppm iron would be 100 percent stabilization rating. The results were reported in percent stabilization. All aliquots were processed in an identical manner, including the pH to which they were raised, the pH increasing agent used, the length and temperature of the heating period, the degree of agitation during the heating period, the length of time the aliquot was allowed to stand at room temperature until sampled, and the portion of the aliquot from which the sample was taken. The polymers so tested were generally tested at varying dosages, reported below in ppm. The test results, dosages, and identity of the polymers tested are set forth below in Table I. The identity of the polymers is given in terms of the mole ratios of monomers and molecular weights. The identity of the monomers is indicated by abbreviations defined just below Table I. For a given polymer dosage where no results are reported, that polymer was not tested at that dosage level. Although no "blank" is set forth on Table I, a plurality of such tests with no water treatment agent indicates that such a blank would have a stabilization percent rating of typically about 1 percent, although this rating has been found to vary up to about 5 percent.

TABLE I

| Example or Comparative Example | Polymer Composition | | | Percent of Iron Stabilization | | | | |
|---|---|---|---|---|---|---|---|---|
| | Monomers* | Mole Ratios | Molecular Wt. | 4 ppm | 6 ppm | 8 ppm | 10 ppm | 12 ppm |
| Example 4 | AA/ACM/AMS | 60/25/15 | 16,400 | 2.5 | 95.0 | 100.0 | — | — |
| Comparative Examples: | | | | | | | | |
| a | AA/AMPS | 70/30 | 12,300 | 3.8 | 50.0 | 87.5 | — | — |
| b | AA/ACM | 25/75 | 10,000 | — | 22.5 | 87.5 | 90.0 | — |
| c | AA/HPA | 2/1 to 3/1 | 7,400 | — | 1.5 | 7.5 | 25.0 | 97.5 |
| d | AA | 100 | 2600 to 4400 | — | — | — | 6.2 | — |

*AA is acrylic acid; ACM is acrylamide; AMS is sulfomethylacrylamide; AMPS is 2-acrylamide-2-methylpropyl-sulfonic acid; HPA is hydroxypropylacrylate

INDUSTRIAL APPLICABILITY OF THE INVENTION

The present invention is applicable to industries wherein the reduction of iron deposits in aqueous systems arising from the presence of soluble iron in the waters thereof is desirable, such as in industries using cooling towers and boilers and the like.

We claim:

1. A process for stabilizing iron hydr(oxide) formed in situ in an aqueous system from soluble iron contained therein, upon an increase of oxidizing conditions comprising an increase in pH to a pH of greater than 8.0, to at least reduce iron hydr(oxide) deposits, comprising:

treating said aqueous system with from 1.0 to 50 ppm of a water soluble polymer having a molecular weight of from 5,000 to 100,000 which contains from 5 to 85 mole percent pendant N-substituted amide functionality units having the chemical formula of

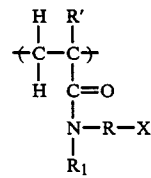

wherein R' is hydrogen or methyl, $R_1$ is hydrogen, R is alkylene having 1 to 3 carbon atoms or phenylene, X is sulfonate, and said alkylene may be further substituted with hydroxy, wherein said water soluble polymer is further comprised of from 15 to 95 mole percent of acrylic acid units or a mixture of acrylic acid and (meth)acrylamide units and wherein said polymer is substantially derived from acrylic acid and acrylamide monomers, subjected to post-polymerization, wherein at least 5 mole percent of its acrylamide amide functionality is converted to said N-substituted amide functionality.

2. The process of claim 1 wherein said polymer has a mole ratio of from 5 to 85 moles of said N-substituted amide functionality-containing units, from about 10 to 90 moles of acrylic acid units, and from 5 to 85 moles of acrylamide units.

3. The process of claim 1 wherein said polymer is substantially a copolymer having a mole ratio of units of from about 5 to about 50 moles of said N-substituted amide-containing units to about 50 to about 95 moles of acrylic acid units and has a molecular weight of from about 5,000 to about 85,000.

4. The process of claim 1 wherein said polymer is substantially a terpolymer having a mole ratio of units of from about 5 to about 70 moles of said N-substituted amide functionality-containing units, from about 20 to about 85 moles of acrylic acid units, and from about 5 to about 60 moles of (meth)acrylamide units, and has a molecular weight of from 5,000 to 85,000.

5. The process of claim 4 wherein said polymer has a mole ratio of units of about from 5 to 50 moles of said N-substituted amide functionality-containing units, from 40 to 85 moles of acrylic acid units, and from 10 to 50 moles of acrylamide units, and has a molecular weight of from 5,000 to 50,000.

6. The process of claim 1 or 3 wherein said polymer is a copolymer of acrylic acid/sulfomethyl (meth)acrylamide.

7. The process of claim 1 or 3 wherein said polymer is a copolymer of acrylic acid/sulfoethyl (meth)acrylamide.

8. The process of claim 1, 2, or 4 wherein said polymer is a terpolymer of acrylic acid/(meth)acrylamide/sulfomethyl (meth)acrylamide.

9. The process of claim 1, 2, or 4 wherein said polymer is a terpolymer of acrylic acid/(meth)acrylamide/sulfoethyl(meth)acrylamide.

10. The process of claim 1, 2, or 4 wherein said polymer is a terpolymer of acrylic acid/(meth)acrylamide/2-hydroxy-3-sulfopropyl (meth)acrylamide.

11. The process of claim 1, 2, or 4 wherein said polymer is a terpolymer of acrylic acid/(meth)acrylamide/sulfophenyl (meth)acrylamide.

12. The process of claim 1 wherein said polymer is a terpolymer of acrylic acid/(meth)acrylamide/sulfomethyl (meth)acrylamide in mole ratio respectively of 40–85/10–50/5–40, and having a molecular weight of from 10,000 to 40,000.

13. The process of claim 1 wherein said polymer is a terpolymer of acrylic acid/(meth)acrylamide/sulfoethyl (meth)acrylamide in mole ratio respectively of 40–85/10–50/5–40, and having a molecular weight of from 10,000 to 40,000.

14. The process of claim 1 wherein said aqueous system is treated with said polymer in the amount of from 0.5 to ppm of said polymer for every 1 ppm of soluble iron in said aqueous system.

* * * * *

UNITED STATES PATENT AND TRADEMARK OFFICE
CERTIFICATE OF CORRECTION

PATENT NO. : 4,869,828

DATED : Sept. 26, 1989

INVENTOR(S) : John E. Hoots, et al.

It is certified that error appears in the above-identified patent and that said Letters Patent is hereby corrected as shown below:

In Claim 14, line 3, before "ppm of said polymer", insert -- 1 --.

Signed and Sealed this

Twenty-eighth Day of August, 1990

Attest:

HARRY F. MANBECK, JR.

*Attesting Officer*  *Commissioner of Patents and Trademarks*